Nov. 6, 1962   W. H. EBURN, JR., ET AL   3,062,115
PHOTOGRAPHIC APPARATUS
Filed Nov. 25, 1960   5 Sheets-Sheet 1

INVENTORS
William H. Eburn, Jr.
BY Otto E. Wolff
Brown and Mikulka
Robert E. Corb
ATTORNEYS Nov. 6, 1962   W. H. EBURN, JR., ET AL   3,062,115
PHOTOGRAPHIC APPARATUS
Filed Nov. 25, 1960   5 Sheets-Sheet 2
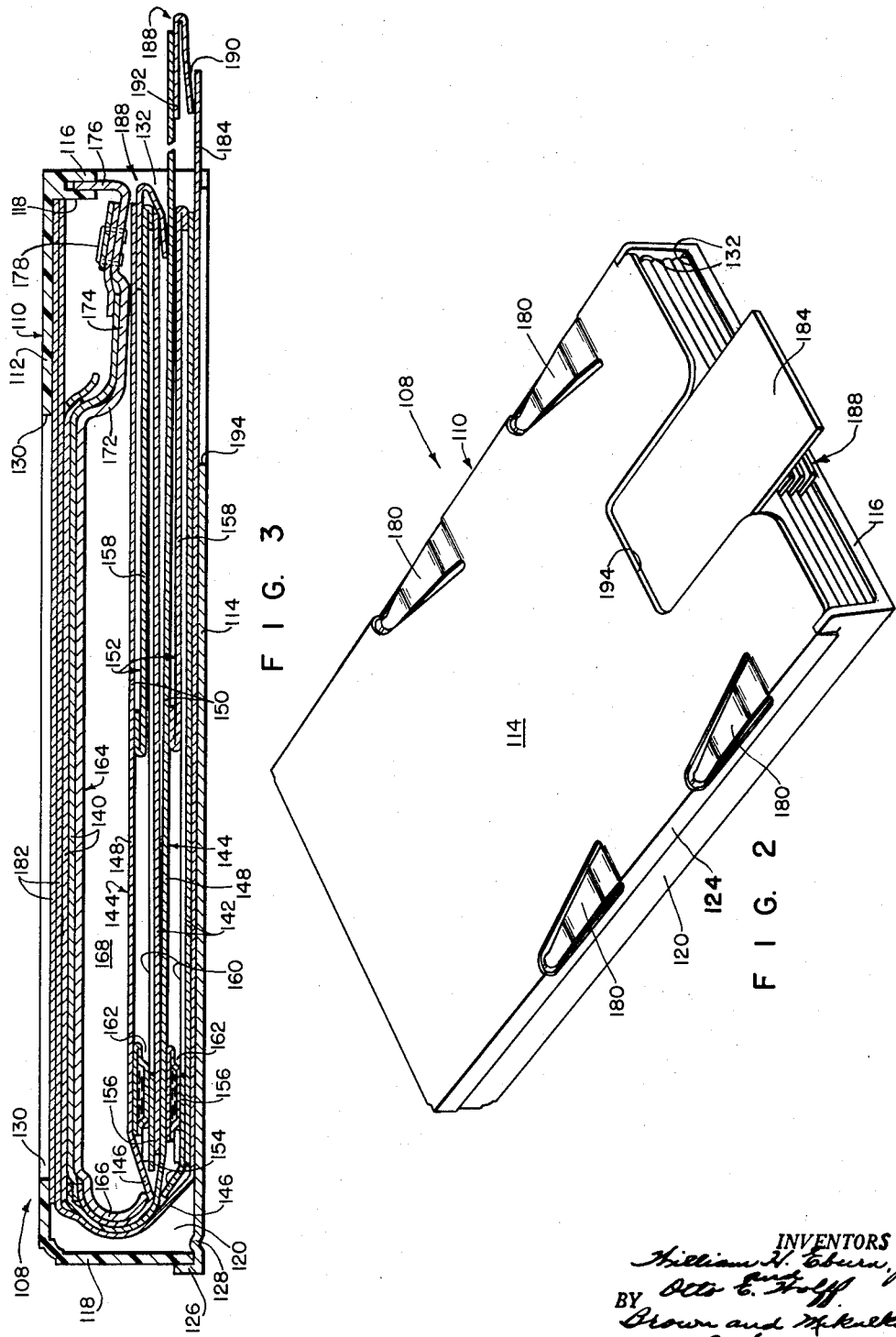
INVENTORS
William H. Eburn, Jr.
Otto E. Wolff
BY Brown and Mikulka
and
Robert E. Corb
ATTORNEYS United States Patent Office 3,062,115
Patented Nov. 6, 1962

3,062,115
PHOTOGRAPHIC APPARATUS
William H. Eburn, Jr., East Weymouth, and Otto E. Wolff, Weston, Mass., assignors to Polaroid Corporation, Cambridge, Mass., a corporation of Delaware
Filed Nov. 25, 1960, Ser. No. 71,709
15 Claims. (Cl. 95—13)

This invention relates to photographic apparatus and, more particularly, to apparatus such as a camera wherein photographic materials are exposed and processed.

An object of the invention is to provide photographic apparatus including a pair of juxtaposed members between which a film unit is moved for distributing a processing fluid within said film unit, and novel and improved means for advancing a leader comprising said film unit between said juxtaposed members.

Another object of the invention is to provide apparatus of the character described wherein said means for advancing said leader moves beween said members in engagement with said leader.

Another object of the invention is to provide means for advancing said leader of the type described, comprising a thin, resilient leader-engaging tongue and means for moving and guiding said tongue in the direction of its elongation along a nonlinear path for causing said element to engage said leader within a container enclosing said film unit and then move said leader from said container and between said jutaposed members.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 2 is a rear perspective view of a photographic film assemblage useful in the apparatus of FIGURE 1;

FIG. 3 is a sectional view taken substantially midway between the sides of the film assemblage of FIG. 2;

Figure 6:
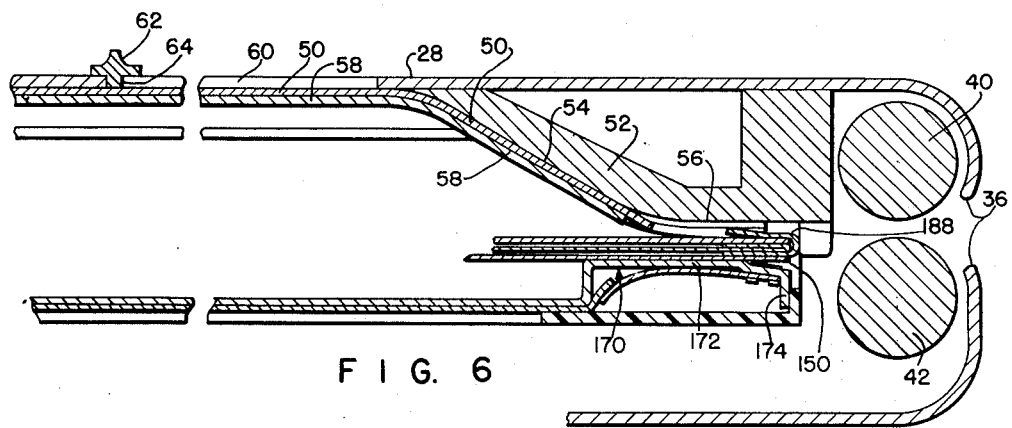
FIGS. 6, 7 and 8 are fragmentary sectional views similar to FIGURE 1 illustrating the invention in the various operative positions thereof.
Figure 7:
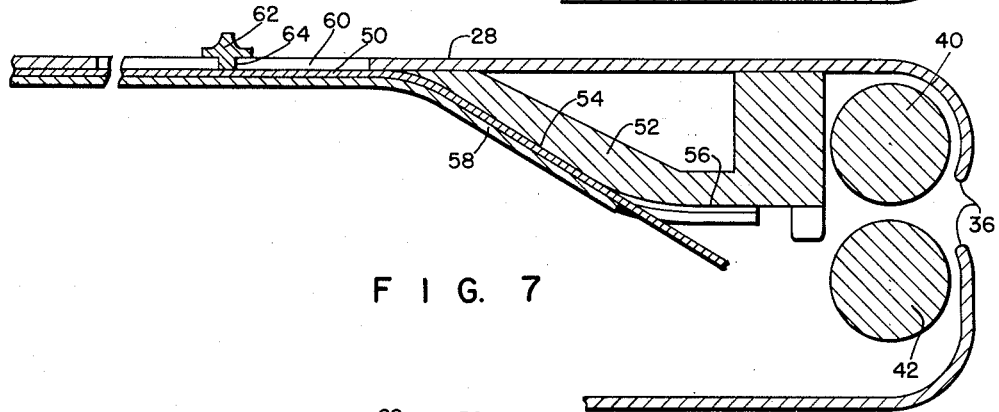
Figure 8:
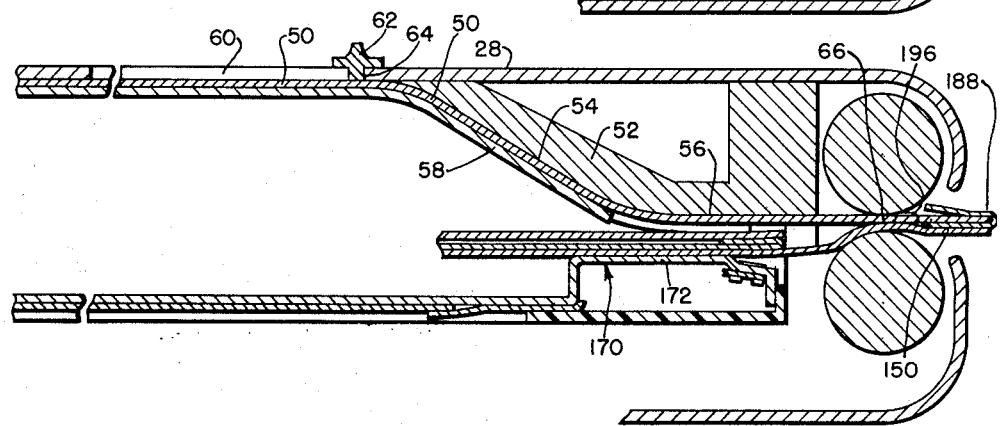
Figure 9:
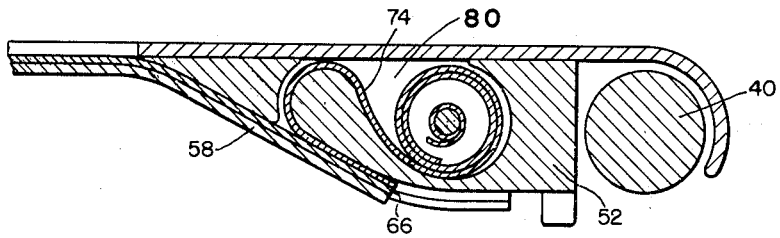
Figure 10:
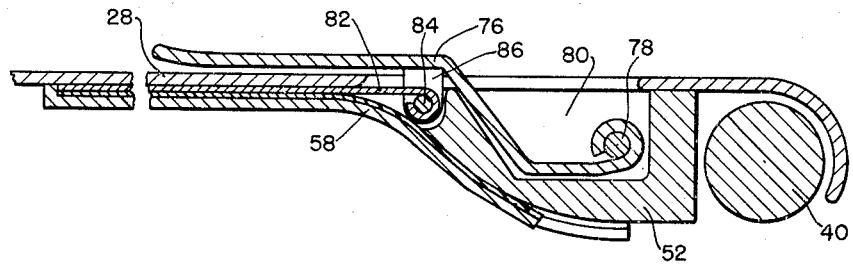
Figure 11:
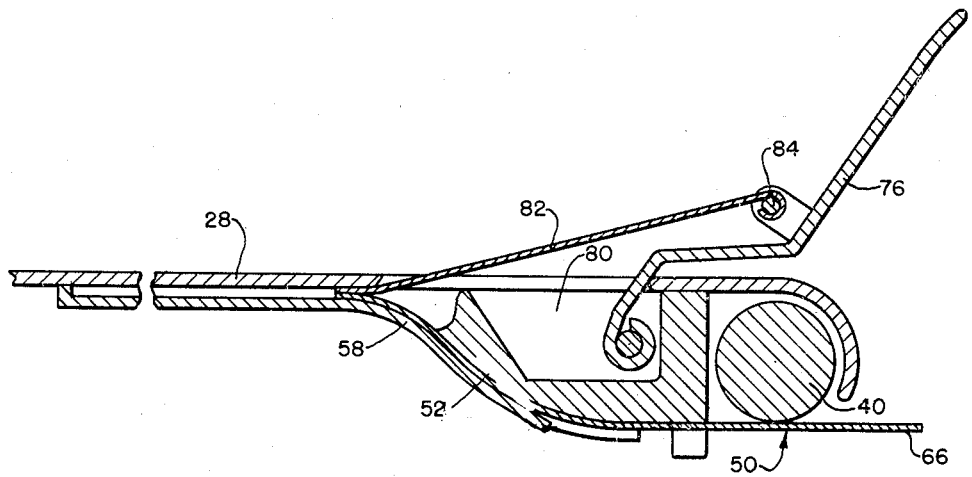

FIG. 9 is a view similar to FIGS. 6 through 8 illustrating another embodiment of the invention; and FIGS. 10 and 11 are views similar to FIGS. 6 through 8 illustrating still another embodiment of the invention in two operating positions thereof.

The present invention is concerned with the construction of novel photographic apparatus in the form of a camera of the type in which a photosensitive sheet is exposed and is thereafter processed, preferably to produce a positive print, by superposing the photosensitive sheet with a second sheet and distributing a fluid processing agent in a layer between the sheets. Distribution of the processing fluid is effected by moving the two sheets in superposition between a pair of juxtaposed members which apply compressive pressure to the sheets to spread the fluid in a thin layer therebetween. The apparatus of the present invention is of the type (shown in U.S. Patent No. 2,991,702 issued July 11, 1961 in the name of Vaito K. Eloranta) which employs an assemblage of individual photographic film units, each comprising a photosensitive sheet and a second sheet which are superposed to effect the processing of the photosensitive sheet. In this type of film assemblage, the photosensitive and second sheets are connected by a leader which is pulled for moving the photosensitive sheet, following exposure thereof, into superposition with the second sheet and for drawing the film unit comprising the photosensitive and second sheets between a pair of juxtaposed pressure-applying members. It has been the practice, in this type of camera, to mount the film assemblages entirely within the camera and to one side of the pressure-applying members, and to provide means in the camera for feeding the leaders, one at a time and in proper succession, from the camera between the pressure-applying members, so that each leader may be grasped manually for withdrawing the film unit which it comprises from the camera between the pressure-applying members to effect the distribution of a processing fluid between the photosensitive and second sheets comprising each film unit.

Various expedients have been proposed for feeding the leaders between the pressure-applying members so that the leaders may be grasped for withdrawing the film units from the camera between the pressure-applying members. In one such system (disclosed in the above-mentioned application), the leader-feeding means frictionally engages each leader and advances a portion of the leader toward and between the pressure-applying members, the leader engaging and advancing means remaining to one side of the pressure-applying members. Since engagement between the leader and the means for moving the leader is frictional, the tensive forces which can be applied to the leader are limited, and, accordingly, the leader is provided with a Z-fold which permits movement of a portion of the leader between the pressure-applying members while another portion of the leader, coupled with the photosensitive and second sheets, remain stationary, and in this way the leader-feeding means is not required to move the photosensitive or second sheets, this last function requiring greater force than is desired to be applied to the leader by the leader-feeding means.

Another system for advancing the leaders from the camera between the pressure-applying members (disclosed in U.S. Patent No. 2,978,971 issued April 11, 1961 in the name of William H. Eburn, Jr.) comprises providing an engagement member on each leader for engaging the trailing end of the preceding film unit so that the preceding film unit draws the leader of the next successive film unit between the pressure-applying members from the camera. In this type of leader-feeding system, the means for engaging and withdrawing each leader moves between the pressure-applying members with the leader which is being withdrawn and is also limited to moving only the leader and not the remainder of the film unit, primarily because it is desirable to prevent movement of the photosensitive element of each succeeding film unit during withdrawal of the preceding film unit, since, at this time, the succeeding film unit has not been exposed as yet. It is also apparent that in this system, at least a leader of a film unit projects from the camera at all times and is subject to being engaged in such a way as to move the other components of the film unit.

The present invention is concerned with a manual leader-feeding system by which it is possible to feed a leader from the camera between the pressure-applying members only when desired. The engagement between the leader and the leader-feeding means is positive, rather than frictional, so that the Z-fold in the leader can be eliminated and the member, which engages and moves the leader between the pressure-applying members, is itself moved between the pressure-applying members during feeding of the leader. The movement of the leader is effected by applying tension to its leading end, so that movement of the end of the leader between the pressure-applying members is not dependent on the inherent stiffness of the leader, as is the case with the frictional leader-feeding system. The elimination of the Z-fold offers a clear advantage, insofar as the construction and assembling of the film assemblage is concerned, since it eliminates many of the assembly problems normally associated with such a construction.

Figure 1:
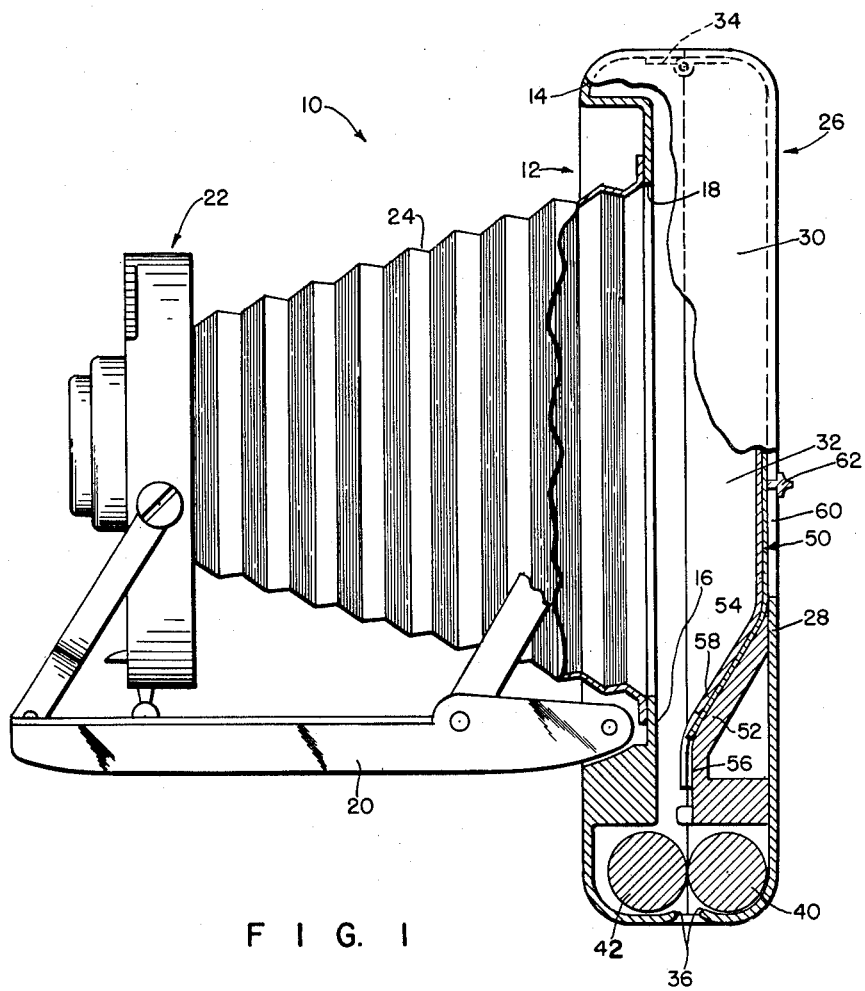
FIGURE 1 is an elevational view, partially in section, of photographic apparatus in the form of a camera embodying the invention.

Reference is now made to FIGURE 1 of the drawings wherein there is shown by way of example apparatus, in the form of a camera designated 10, embodying the invention. The camera comprises a housing including a forward section 12 having a forward wall 14 with a recessed or re-entrant section 16, including an exposure aperture 18 through which exposure of photosensitive materials, positioned within the camera, is effected. A hinged door 20 is provided for covering recessed section 16 and for acting as a bed on which is mounted a conventional lens and shutter assembly 22 connected to recessed section 16 by a collapsible bellows 24, secured at one end to the lens and shutter assembly and at its other end to the recessed section in surrounding relation to aperture 18. While the apparatus is shown in the form of a camera, it also may be constructed in the form of a camera back or film pack adapter intended to be mounted on or coupled with the rear of a camera, in which case the door, lens and shutter assembly and bellows would be eliminated and the front of the housing would be constructed for attachment to the camera or other exposure device with which the camera back or adapter is to be employed. The camera housing includes a rear section 26 having a rear wall 28 and side walls 30 cooperating with the forward housing section to provide a chamber 32 behind aperture 18 for containing a film pack in position for exposure through aperture 18. The film pack is mounted within chamber 32 with a forward section of the pack located against the rear surface of re-entrant section 16. The rear housing section 26 is pivotally secured to forward housing section 12 at one end of the housing herein shown and designated, for purposes of description, as the upper end, by a hinge 34, thereby permitting the two housing sections to be separated to allow loading of a film pack into chamber 32. An opening 36 is provided at the lower end of the camera housing intermediate the forward and rear housing sections to permit withdrawal of a film unit from the housing. Suitable latch means (not shown) of a conventional type are provided in the lower portion of the housing for retaining the two housing sections together in the closed or operative position thereof shown in the drawings.

Figure 4:
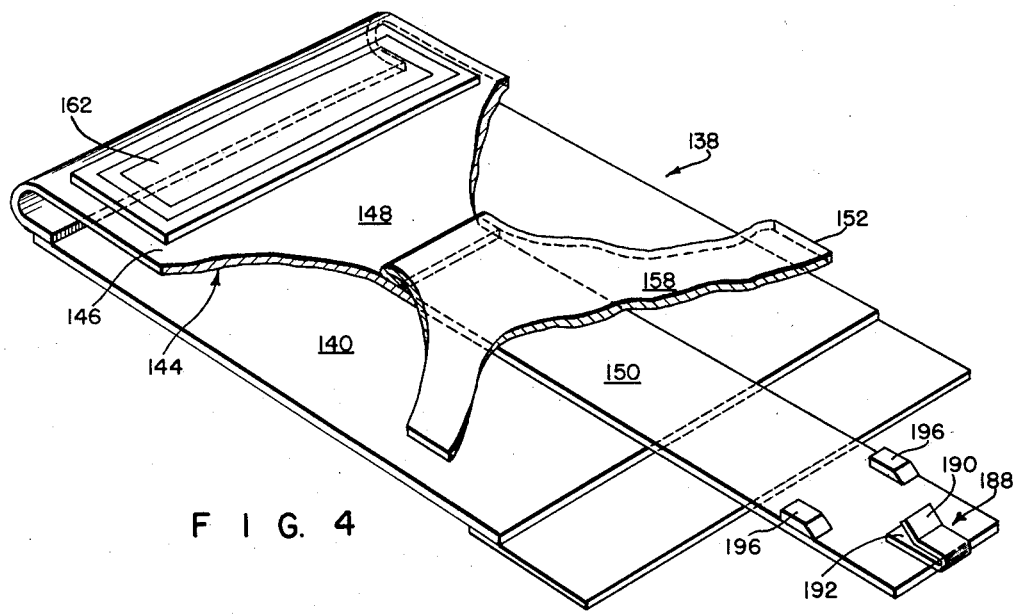
FIG. 4 is a fragmentary perspective view showing a film unit comprising the film assemblage of FIG. 2.
Figure 5:
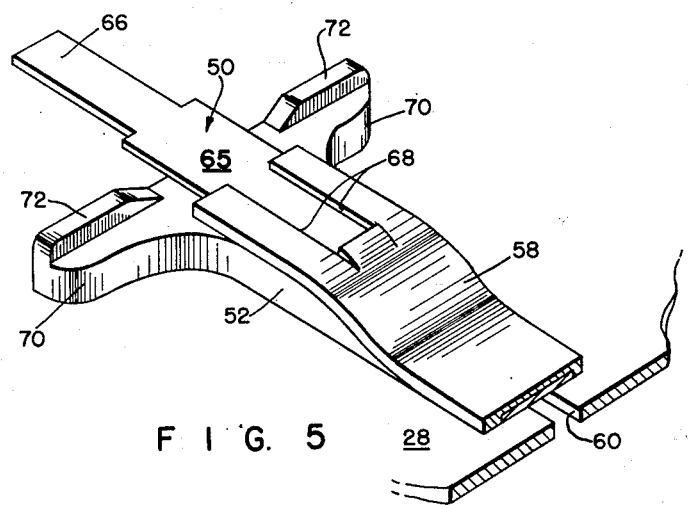
FIG. 5 is a fragmentary perspective view showing components of the apparatus of FIG. 1.

Camera 10, as indicated, is designed for use with a film pack, that is, an assemblage of individual film units each adapted to be exposed and processed to produce a visible image. The camera shown is particularly adapted for use with a film pack of the type shown in the aforementioned Patent No. 2,991,702. The film pack, shown by way of example in FIGS. 2 through 4 of the drawings, comprises a plurality of film units, each adapted to be exposed and processed for producing a positive photographic print, enclosed in a lightproof container which allows the film units to be exposed in proper succession. Each film unit comprises a photosensitive sheet which may be exposed for producing a photographic image, a second or print-receiving sheet for supporting a positive transfer image formed from the photosensitive sheet, a rupturable container of a fluid agent for reacting with the exposed photosensitive sheet to produce a positive transfer image on the second sheet, and means including a leader for coupling the two sheets and withdrawing the sheets in superposition from the camera between the pressure-applying members. Following exposure of each photosensitive sheet, the film unit comprising the photosensitive sheet is withdrawn from the container between the pressure-applying members in the camera for spreading the processing fluid from the rupturable container of the film unit between the photosensitive and second sheets.

The film pack, designated 108, comprises a generally parallele-piped shaped container 110 having a forward wall 112, a rear wall 114, end walls 116 and 118, and side walls 120. The container may be formed of any stiff material which is opaque to light actinic to the photosensitive materials carried in the container, for example, cardboard, stiff paper, metal, organic plastics and the like. In the form shown, the container comprises a first or forward section including forward wall 112, end walls 116 and 118 and side walls 120, and a second or rear section comprising rear wall 114. The forward section is preferably formed of an organic plastic material and includes laterally projecting flanges 122 along the rearmost edges of side walls 120. Rear wall 114 of the rear section is preferably formed of sheet metal and includes channels 124 at its lateral edges for engaging flanges on side walls 120, and a flange 126 at one edge for engaging end wall 118 to prevent sliding movement of the rear section in the direction of its other end relative to the forward section and to prevent admission of light into the container at the juncture of the end wall 118 and rear wall 114. Rear wall 114 is also provided with inwardly depressed portions 128 located adjacent flange 126, the portions acting as detents cooperating with the flange for preventing movement of the rear section relative to the forward section of the container. Forward wall 112 is provided with a rectangular exposure aperture 130 for transmitting light to the photosensitive materials positioned for exposure within the container underlying the forward wall. The container includes a second or withdrawal opening, designated 132, defined by the rear edge of end wall 116 and rear wall 114, the end wall extending only partially toward the rear wall for this purpose.

The film pack comprises at least one and preferably a plurality of film units, each designated 138, contained entirely within container 110 and adapted to be withdrawn from the container through opening 132. Each film unit 138 comprises a first or photosensitive sheet 140 and a second or print-receiving sheet 142. The photosensitive sheet is rectangular and comprises a layer of photosensitive material carried on a suitable support, for example, a silver halide layer carried on any one of the conventional film base materials such as paper, metal foils, organic plastics and the like. Second sheet 142 is substantially equal in width to the photosensitive sheet, is slightly longer and comprises a flexible sheet material such as paper, organic plastic, metallic foil and the like; and may be adapted to merely aid in the spreading of the fluid processing composition in a thin layer on the photosensitive sheet or, in the preferred form, is adapted to provide a support for a positive transfer print produced, for example, by a silver halide diffusion-transfer reversal process such as described in U.S. Patents Nos. 2,543,181, issued February 27, 1951, and 2,662,822, issued December 15, 1953, both in the name of Edwin H. Land. The support sheets comprising the photosensitive and second sheets are either opaque, or include layers which are opaque, to light actinic to the photosensitive material.

Photosensitive sheet 140 is joined at its leading edge to a first carrier sheet 144 comprising an end section 146 which is approximately equal in width to the photosensitive sheet and is joined to the photosensitive sheet, an intermediate tapered section 148 and a narrow elongated leader section 150. Second sheet 142 is mounted on a second carrier sheet 152 comprising a trailing end section 154, an intermediate section 156 coextensive with said second sheet and a leading end section 158 including a tapered end portion. Print-receiving sheet 142 is mounted on intermediate section 156 with the print-receiving layer of the sheet located adjacent carrier sheet 152. Intermediate section 156 is provided with a generally rectangular aperture 160 defining the area of the print-receiving sheet against which the fluid processing composition is spread and wherein a transfer print is produced. The lateral margins of intermediate section 156, adjacent the sides of aperture 160, cooperate for confining the processing fluid between the sheets and for controlling the thickness of the layer of fluid spread between the sheets. Trailing end section 154 of the second carrier sheet 152 extends beyond the trailing edge of the second sheet for collecting and retaining excess processing fluid.

Carrier sheets 144 and 152, in addition to aiding in the spreading of the processing fluid in a layer of predetermined thickness, determining both the area to be processed and the dimensions of the transfer print and collecting excess processing fluid, provide means for connecting the photosensitive and second sheets, properly locating or registering the photosensitive and second sheets relative to one another when the sheets are superposed, superposing the photosensitive and second sheets, mounting a container of fluid processing composition and moving the film unit within the container and withdrawing the film unit from the container and camera between the pressure-applying members.

The photosensitive and second sheets are processed by a fluid composition carried in a rupturable container 162 mounted on end section 146 of first carrier sheet 144. The container is formed substantially as shown in the above-mentioned U.S. Patent No. 2,543,181, and comprises a rectangular blank of fluid- and air-impervious sheet material folded longitudinally upon itself to provide two walls bonded together at their margins to form an elongated cavity for the processing fluid. The longitudinal seal is weaker than the end seals, and is adapted to become unsealed in response to hydraulic pressure generated within the fluid contents of the container by the application of compressive pressure thereto. Container 162 is mounted on end section 146 with the longitudinal edge, which is adapted to become unsealed, facing the photosensitive sheet.

The components of film unit 138, when assembled for exposure in a film pack, assume the relative positions shown in FIG. 3 of the drawings. In this position, the photosensitive and print-receiving sheets 140 and 142 overlie one another with the photosensitive and print-receiving layers thereof facing in the same direction, and the photosensitive layer located outermost in position for exposure. The leading and trailing edges of each sheet are located adjacent, respectively, the trailing and leading edges of the other. First carrier sheet 144 is folded adjacent the leading edge of photosensitive sheet 140 so as to extend between the photosensitive and second sheets toward the trailing end of the photosensitive sheet and the leading end of the second sheet. Second carrier sheet 152 is folded adjacent the leading end of second sheet 142 so that it extends toward the trailing end of the second sheet and the leading end of the photosensitive sheet to a position approximately midway between the ends of the photosensitive and second sheets where tapered leading end section 158 is folded and joined to tapered section 148 of first carrier sheet 144.

The film unit, as part of a film pack, is assembled around a dividing element in the form of a pressure plate 164 mounted within container 110. Pressure plate 164 is approximately equal in width to container 110 and comprises a generally flat or planar section underlying exposure aperture 130 and extending beyond the edges of the exposure aperture. The pressure plate includes a rearwardly extending rolled edge section 166 at its trailing edge, rearwardly extending flanges 168 at its lateral edges, and a leading end section 170, including a first portion 172, disposed substantially in a plane parallel with the planar portion of the pressure plate and located rearwardly thereof, and an end portion 174 extending forwardly at a right angle with the intermediate portion. Pressure plate 164 is positioned within container 110 with flanges 168 disposed adjacent side walls 120 and with end portion 174 extending toward forward wall 112 adjacent end wall 116. Portions of rear wall 114 are punched out and deformed inwardly to provide springs 180 for engaging flanges 168 and urging pressure plate 164 forwardly against forward wall 112.

Each film unit 138 of the film pack is disposed within container 110 with the photosensitive sheet 140 thereof located forward of the pressure plate between the latter and forward wall 112. End section 146 of first carrier sheet 144 extends around rolled end section 166 of the pressure plate; and second sheet 142, tapered section 144 and leader section 150 of the first carrier sheet and second carrier sheet 152 are all disposed behind the pressure plate between it and rear wall 114, the second carrier sheet and the last-mentioned portions of the first carrier sheet being disposed between second sheet 142 and the pressure plate. A plurality of film units 138 are provided in the container, each arranged in the same manner with the photosensitive sheets arranged in one stack forward of the pressure plate and the second sheets arranged in another stack to the rear of the pressure plate. The photosensitive sheets extend across exposure aperture 130 in position for exposure, and the second sheets are located behind the pressure plate with their leading edges adjacent withdrawal opening 132 in position to be withdrawn through the opening.

The film pack is provided with a pair of cover sheets 182 located in superposed relation across exposure aperture 130, between forward wall 112 and the foremost photosensitive sheet 140 to prevent exposure of the photosensitive sheet. Cover sheets 182 are formed of a light-opaque sheet material and are provided in duplicate to preclude any chance of exposure of the photosensitive sheet due to a minute hole in one of the cover sheets. A leader 184 is provided connected to the leading ends of the cover sheets and extends through withdrawal opening 132 from the container, to provide means for withdrawing the cover sheets from the container following loading of the pack into the camera.

Each film unit 138 includes means by which the film unit may be engaged for withdrawing leader section 150 of the film unit from the container through opening 132 and from the camera between the pressure-applying members thereof. This engagement means may take the general form of a clip, designated 188, formed of a generally rectangular blank of thin sheet material, such as metal or organic plastic. In the form shown, clip 188 comprises a blank folded upon itself intermediate its ends to provide an engagement section 190 and a slightly longer base section 192, both extending in substantially the same direction closely adjacent one another. Engagement section 190 and base section 192 are bent slightly in the same direction, away from the engagement section, at a location approximately midway between the ends of the shorter engagement section to promote retention of the clip in engagement with a sheet located between the two sections of the clip and so that the free end of engagement section 190 has a tendency to diverge from the adjacent portion of base section 192 when the clip is engaged around a sheet. Clip 188 is secured to leader section 150 at the base section of the clip with the folded portion of the clip located adjacent the leading edge of the leader section. Clip 188 is constructed so as to engage a sheet or the like which is thin and substantially flat and is deformable, at least slightly, by insertion between the sections of the clip, and the clips are formed of a very thin sheet material having a thickness, for example, on the order of a few thousandths of an inch, so that they may be moved between the pressure-applying members with very little effort. For further examples and details of clips of the type shown, reference may be had to the aforementioned U.S. Patent No. 2,978,971.

The clip 188 of each film unit is retained in position to be engaged and moved from the film pack between the pressure-applying members of the camera by engagement around the leading edge of second carrier sheet 152, with the engagement section 190 of the clip located to the rear of the second carrier sheet. In this position, the engagement section of the clip is deformed slightly to the rear so as to be readily engaged by means in the camera for moving the clip between the pressure-applying members. In order to permit engagement and movement of the clips from film pack container 110, rear wall 114 of the container is provided with an opening 194 extending inwardly from the edge of rear wall 114 adjacent opening 132, and overlying leader sections 150 and clips 188 attached thereto.

The camera comprises a pair of juxtaposed pressure-applying members located within chamber 32 at the lower end thereof adjacent opening 36. The pressure-applying members, in the form shown, comprise a pair of generally cylindrical rolls 40 and 42 mounted for pivotal movement about their axes which are located substantially in a common plane extending transversely of the direction of movement of the film units through opening 36 and across the opening. The pressure-applying members, in this case rolls 40 and 42, are preferably biased toward one another into juxtaposition, and means (not shown) are provided for initially spacing the sheet-engaging surfaces of the rolls apart from one another to provide a gap of fixed minimum depth between the sheet-engaging surfaces of the rolls. The purpose of this fixed minimum gap, which should not exceed the combined thicknesses of a film unit in the area of the photosensitive and second sheets and the layer of processing fluid to be distributed between the sheets, is to allow a leader section 150 of each film unit to be fed between the pressure-applying rolls so that the leader may be grasped on the outside of the rolls for drawing the film unit, comprising the leader section, between the rolls. The rolls are mounted separately on the forward and rear sections of the camera housing so that the rolls are spaced apart from one another when the camera housing is opened to permit loading of a film pack into the camera. This allows leader 184, coupled with cover sheets 182, to be positioned between the rolls with a portion of the leader extending from the camera housing through opening 36. It is contemplated that roll 40 will be mounted on the rear housing section in fixed position, while roll 42 is mounted on the forward housing section for movement toward and away from roll 40. The mounting means for roll 42 may comprise, for example, a pair of cantilever springs mounted on the forward housing section for both supporting roll 42 and biasing the roll toward roll 40. The mounting means for the rolls may also be constructed so as to engage one another and provide the initial minimum spacing of the sheet-engagement surfaces of the rolls. For additional details of the construction and arrangement of the rolls and means for mounting the rolls, reference may be had, for example, to the aforementioned U.S. Patent No. 2,991,702.

In accordance with the invention, camera 10 is provided with manually operable means (shown in FIGS. 5 through 8 of the drawings) for engaging clips 188 and feeding the clips and leader sections 150 attached thereto between the pressure-applying rolls and from the housing, where the leader sections may be grasped for drawing the film units from the camera housing between the pressure-applying rolls. This means comprises a thin, elongated strip or tongue 50 formed of a flexible sheet material having at least more rigidity than the sheet material comprising the film unit. Tongue 50 is preferably in the form of a flat cantilever spring which can be deformed, but which tends to assume a flat or planar condition.

Guide means are provided in the camera mounted on rear wall 28 for guiding tongue 50 along rear wall 28 behind the film pack mounted in chamber 32, thence downwardly and forwardly into the pack through opening 194 and thence in engagement with a clip 188 between rolls 40 and 42 from the camera through opening 36. In the form shown, the guide means comprises a support member 52 having a support surface facing forwardly within the camera housing. The support surface includes a first section, designated 54, which is inclined away from the inner surface of rear wall 28 toward the front of the camera and a second section 56 which blends into first section 54 and which is located in a plane generally parallel with the focal plane of the camera and extends toward the gap between the pressure-applying rolls. A curved cover plate 58, having a channel therein, is provided secured to rear wall 28 and the first and second sections 54 and 56 of the support surface of guide member 52, and cooperates with the inner surface of rear wall 28 and the support surface to form a channel in which tongue 50 is movable in the direction of its elongation. To permit manual movement of the tongue, rear wall 28 is provided with a slot 60 overlying strip 50. A manually engageable member 62 is secured to the upper end portion of tongue 50 by a pin 64 which projects through slot 60, the latter allowing member 62 to be located externally of rear wall 28 where it may be engaged for moving the tongue in the direction of its elongation within the channel provided by rear wall 28, guide member 52 and cover plate 58.

Tongue 50 is provided with a base section 65 and a narrower leading end section 66. Cover plate 58 is provided with a slot 68 in the portion thereof overlying second section 56 of guide member 52. Slot 68 is narrower than base section 65 of tongue 50 and just slightly wider than end section 66 of the tongue so that the cover plate cooperates with the second section of the guide surface of member 52 to guide base section 65 of tongue 50 toward and through the gap between the pressure-applying rolls. However, it is desirable that the leading end section of the tongue, which engages clips 188, move into the film pack toward leader sections 150 supported on first portion 172 of the leading end section of pressure plate 164, in order to insure engagement of clips 188 by end section 66. Slot 68 begins in the region wherein first section 54 of the guide surface begins to curve to blend into second section 56 of the guide surface. In this region, tongue 50 extends both forwardly and toward the pressure-applying rolls, so that, as the tongue is moved forwardly and toward the pressure-applying rolls, end section 66 projects through slot 68 and, during a short portion of its movement, moves in a plane forwardly and downwardly through opening 194 into the pack toward leading end section 170 of pressure plate 164. As the base section of tongue 50 becomes engaged by the portions of cover plate 58 bordering slot 68, the tongue is then bent rearwardly, so that the leading edge of end section 66 then follows a curved path until the end section is disposed in the plane of second section 56 of the guide surface, whereafter the remaining portion of the movement of end section 66 is in the plane of the gap between the pressure-applying rolls. Thus, the path of movement of end section 66 is from a first position, shown in FIG. 6, in a plane forwardly and toward the pressure-applying rolls to a second position, shown in FIG. 7, and thence, along a curve rearwardly to the plane of the gap between the rolls and thence, in a plane between the rolls, to the position shown in FIGS. 5 and 8. It is during movement of end section 66 between the positions shown in FIGS. 6 and 7, that the end section engages a clip 188 for advancing the clip and the leader section 150 coupled therewith, through opening 132 between pressure-applying rolls 40 and 42 through opening 36 from the camera.

In the operation of the leader-feeding means, the operator engages member 62, sliding the latter downward toward the pressure-applying rolls until a leader section 150 has been fed between the rolls from the camera, whereupon the operator returns member 62 and tongue 50 coupled therewith to their original positions, shown in FIG. 6, in readiness to feed another leader. The operator may then grasp leader section 150 and the clip 188 attached thereto for withdrawing a film unit between the pressure-applying rolls from the camera. Means are provided on the leader sections 150 for preventing the leader sections from moving back into the camera together with tongue 50, as the latter is withdrawn into the camera. This last-mentioned means, in the form shown, comprises spacing members 196 mounted on each leader section 150 adjacent clip 188. The thickness of spacing members 196 is such that the combined thickness of the spacing members and the leader sections is approximately equal to or greater than the fixed minimum depth of the gap between the pressure-applying rolls. The spacing members thereby resist movement of the leader section between the pressure-applying rolls, and prevent return movement of the leader sections back between the rolls, due to friction between the leader section and tongue 50 as the latter is withdrawn into the camera between the rolls. The leading edges of spacing members 196 may be skived or tapered in order to facilitate movement of the members between the rolls from the camera.

Guide member 52, in the form shown, is provided with outwardly extending lateral sections 70 having forwardly extending engagement sections 72 located on opposite sides of tongue 50. Engagement sections 72 project across opening 132 in the film pack container, and are disposed in the path of movement of the film units from the container, so as to engage the leading ends of second sheets 142 and prevent movement of the second sheets from the container as a leader section 150 is being moved from the container between the pressure-applying rolls. When the operator grasps and draws a leader section 150 between the pressure-applying rolls from the camera, the photosensitive sheet, coupled with the leader section, is first drawn around rolled edge section 166 of pressure plate 160, into superposition with the second sheet 142 of the same film unit, and the two sheets of the film unit are drawn past engagement members 72 between pressure-applying rolls 40 and 42 from the camera housing through opening 36. The photosensitive sheet of each film unit is retained against movement, due to frictional engagement with the photosensitive sheets of other film units, by a trailer sheet 176, joined to each photosensitive sheet at the trailing end thereof, and coupled with first portion 172 of leading end section 170 of pressure plate 164. This coupling may be effected by such means as staples 178, which pass through both first section 172 and trailer sheets 176 at the corners of the trailer sheets. The corners of each trailer sheet are designed to tear away when the photosensitive sheet, coupled with the trailer sheet, is pulled toward the trailing end of the film pack, around rolled edge section 166 of the pressure plate.

In another form of leader-feeding means, shown in FIG. 9, a negator spring 74 is provided for returning tongue 50 to its original position within the camera following feeding of a leader between the pressure-applying rolls from the camera. Negator spring 74 is of the conventional type, biased into a coiled condition, is housed in a chamber 76 provided for this purpose by guide member 52, and is joined at its leading end to tongue 50.

Means, other than a manually engageable sliding member 62, may be provided for operating tongue 50, a pivotable lever 76 being shown, by way of example, in FIGS. 10 and 11. Lever 76 is pivoted at one end about a pin 78 mounted in a recess 80 provided by guide member 52. A second flexible leaf or strip 82 is provided, coupled at one end to the trailing end of base section 65 of tongue 50, and at its other end to a pin 84 mounted on ears 86 extending forwardly from lever 76 intermediate the ends of the lever. Lever 76, in operation, is pivoted from the position, shown in FIG. 10, wherein it is disposed externally of and adjacent rear wall 28, in a clockwise direction, downwardly toward the pressure-applying rolls, to the position shown in FIG. 11. During this pivotal movement of lever 76, second strip 82, coupled with the base section of tongue 50, causes the movement of the tongue toward the pressure-applying rolls, moving end section 66 into engagement with a clip 188, and moving the end section, clip and leader section 150, engaged therewith, between the pressure-applying rolls through opening 36 from the camera. A suitable spring means may be provided for returning lever 76 and the tongue to their original positions, such means comprising, for example, a torsion spring (not shown) coiled around pin 78 in engagement with lever 76.

The leader-feeding means of the invention offers a number of advantages including, for example, a positive engagement with the leader to be fed from the camera, so that feeding of a leader is always insured. Moreover, tongue 50 engages the leader at its leading end, so that the leader is drawn between the pressure-applying rolls by tension, and feeding of the leader between the rolls is dependent only on the stiffness of the tongue, rather than the stiffness of the material (usually paper) comprising the leader itself. A further advantage of this system resides in the fact that no leader need project from the camera until the operator is desirous of withdrawing a film unit from the camera for processing. Otherwise, a leader projecting from the camera is subject to being accidentally engaged and either torn or pulled so that movement of the photosensitive sheet, prior to exposure, may result. Additionally, the present system, being one of positive, rather than frictional, engagement between the feeding device and the leader, eliminates the necessity for the Z-fold in the leader heretofore considered to be advisable in systems depending on frictional engagement. By eliminating the Z-fold, the advancement of a leader from the camera between the pressure-applying rolls may be made operative to advance the tapered sections of the first and second carrier sheets into engagement with the pressure-applying rolls. It has been found that, when the carrier sheets are advanced manually into engagement with the rolls, the operator may accidentally advance the film units at an angle with respect to the axis of the rolls, rather than perpendicular to the axis of the rolls, so that the rolls engage the carrier sheets and cause the entire film units to advance between the rolls at this same angle. This, of course, results in a lateral, as well as a lengthwise, movement of the sheets between the rolls termed "mistracking," and may result in one edge of the film unit engaging the sides of the camera and becoming rolled or even torn. If the tapered sections of the carrier sheets are moved into engagement with the pressure-applying rolls mechanically, rather than manually, so that the carrier sheets are properly engaged to begin with, then movement of the remainder of the film unit between the pressure-applying rolls in the correct direction (proper tracking) is substantially insured, regardless of the direction in which the operator pulls on the leader.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for treating with a fluid a photographic film unit including a leader which is employed for moving said film unit through and from said apparatus, said apparatus comprising, in combination: a pair of juxtaposed pressure-applying members between which said film unit is withdrawn from said apparatus for distributing a fluid within said film unit; and means for advancing a portion of said leader from a position to one side of said members between said members to the opposite side thereof so that said portion can be engaged for withdrawing said film unit between said members; the last-mentioned means comprising a thin, elongated engagement element having a leading end section movable in engagement with said leader between said pressure-applying members to said opposite side thereof, guide means mounting said engagement member for movement in the direction of its elongation into engagement with said leader and together with said leader between said members from said one side thereof to said opposite side thereof, and means coupled with said engagement element for moving said engagement element into engagement with said leader and thence, together with said leader, between said members.

2. In photographic apparatus for exposing and thereafter treating with a fluid a photographic film unit including a leader which is employed for moving said film unit through said apparatus, in combination, a pair of juxtaposed pressure-applying members between which said film unit is moved for distributing a fluid within said film unit, and means for advancing at least a portion of said leader from a position to one side of said members between said members to the opposite side thereof, the last-mentioned means comprising a thin, elongated engagement element having a leading end section movable in engagement with said leader between said pressure-applying members to said opposite side thereof, guide means mounting said engagement member for movement in the direction of its elongation into engagement with said leader and together with said leader between said members from said one side thereof to said opposite side thereof, and manually operable means coupled with said engagement element for moving said engagement element into engagement with said leader and thence, together with said leader, between said members.

3. Photographic apparatus as defined in claim 2 for use with a photographic film assemblage including a container enclosing said film unit, and wherein said guide means is constructed for guiding said leading end section of said engagement element along a curved path into said container into engagement with said leader and from said container, and thence, along a substantially linear path between said pressure-applying members.

4. Photographic apparatus for exposing and thereafter treating with a fluid a photographic film unit including a leader which is employed for moving said film unit through and from said apparatus, said apparatus comprising, in combination, a housing having an opening through which said film unit is movable, a pair of pressure-applying members mounted in juxtaposition within said housing adjacent said opening, said pressure-applying members providing means for distributing a fluid within said film unit during movement of said film unit between sad members through said opening from said housing, and means for advancing at least a portion of said leader from a position at the side of said members opposite said opening between said members and through said opening, the last-mentioned means comprising a thin, elongated tongue having an end section for engaging said leader, means coupled with said tongue for moving said tongue in the direction of its elongation, and guide means for guiding said end section of said tongue into engagement with said leader and in engagement with said leader between said pressure-applying members, and through said opening from said housing.

5. Photographic apparatus as defined in claim 4 for use with a film unit which is enclosed in a container, and wherein said guide means is constructed for guiding said end section of said tongue along a nonlinear path into said container into engagement with said leader, and thence, in engagement with said leader, from said container between said pressure-applying members and through said opening from said apparatus.

6. In photographic apparatus for exposing and thereafter treating with a fluid a photographic film unit including a leader employed for moving said film unit through and from said apparatus, in combination, a housing having an opening through which said film unit is movable, a pair of pressure-applying members mounted in juxtaposition within said housing adjacent said opening, and means for advancing said leader from a position at the side of said pressure-applying members opposite said opening between said pressure-applying members and through said opening to the outside of said housing, the last-mentioned means comprising a thin, elongated tongue having a base section and a leading end section, the latter being constructed for engaging said leader, means coupled with said tongue for moving said tongue in the direction of its elongation, and guide means for engaging said base section of said tongue to guide said base section of said tongue along a first path and guide said leading end section of said tongue along a second path into engagement with said leader and then, in engagement with said leader, between said pressure-applying members through said opening from said housing.

7. In photographic apparatus for exposing and thereafter treating with a fluid a photographic film unit including a leader employed for moving said film unit through and from said apparatus, in combination, a housing having an opening through which said film unit is movable, a pair of pressure-applying members mounted in juxtaposition with a gap therebetween within said housing adjacent said opening, said pressure-applying members providing means for distributing a fluid within said film unit during movement of said film unit between said members through said opening from said housing, and means for advancing at least a portion of said leader from a position at the side of said members opposite said opening between said members and through said opening, the last-mentioned means comprising a thin, elongated, resilient tongue having a base section and a leading end section for engaging said leader, at least said leading end section of said tongue being constructed to assume a generally planar configuration, actuating means coupled with said tongue for moving said tongue in the direction of its elongation, and guide means comprising a first guide member having a guide surface including a first portion directed toward said leader of a film unit positioned within said apparatus and a second portion directed toward said gap between said pressure-applying members, and a second guide member for engaging said base section of said tongue for retaining said base section of said tongue against said guide surface during movement of said tongue in the direction of its elongation.

8. The photographic apparatus of claim 7 wherein a portion of said actuating means projecting outside of said housing and is manually engageable for moving said tongue into engagement with said leader and, in negagement with said leader, between said pressure-applying members and through said opening from said housing.

9. The photographic apparatus of claim 8 wherein said actuating means is coupled with said base section of said tongue at the trailing end thereof.

10. The photographic apparatus of claim 7 wherein spring means are provided coupled with said tongue for biasing said tongue for movement in a direction opposite to the direction of movement of said tongue for moving said leader between said pressure-applying members and thereby returning said tongue to a position for engaging and moving a leader between said pressure-applying members.

11. The photographic apparatus of claim 7 wherein said base section of said tongue is substantially wider than said end section of said tongue and includes marginal portions extending laterally beyond the lateral edges of said leading end section, and said second guide member includes portions disposed adjacent said second portion of said guide surface for engaging only said marginal portions of said base section of said tongue.

12. In photographic apparatus for exposing and thereafter treating with a fluid a photographic film unit enclosed in a container and including a leader for moving said film unit through and from said container and said apparatus, in combination, a housing for enclosing said container having an opening through which said film unit is movable from said container, a pair of pressure-applying members mounted in juxtaposition within said housing adjacent and in alignment with said opening, said pressure-applying members being mounted with a gap therebetween through which said film unit is movable for distributing said fluid within said film unit, and means for advancing said leader from said container through said gap between said pressure-applying members and through said opening from said housing to permit said leader to be engaged outside of said housing for drawing said film unit from said container between said pressure-applying members through said opening from said housing, the last-mentioned means comprising a thin, elongated, resilient tongue having a base section and a leading end section for engaging said leader, at least said leading end section of said tongue being constructed to assume a generally planar configuration, actuating means coupled with said tongue for moving said tongue in the direction of its elongation, and guide means for guiding said base and end sections of said tongue along different paths, the path of at least said end section of said tongue extending into said container into engagement with said leader and thence between said pressure-applying members and through said opening from said housing, said guide means comprising a first guide member having a support surface including a first portion extending into said container toward said leader and a second portion extending generally in a plane toward said gap between said pressure-applying members, and a second guide member coupled with said first guide member for engaging said base section of said tongue for retaining said base section of said tongue against said guide surface during movement of said tongue in the direction of its elongation.

13. The photographic apparatus of claim 12 wherein spring means are provided coupled with said tongue for biasing said tongue for movement in a direction opposite to the direction of movement of said tongue for moving said leader between said pressure-applying members and thereby locating said tongue in position for engaging and moving a leader between said pressure-applying members.

14. The photographic apparatus of claim 12 wherein said base section of said tongue is substantially wider than said end section of said tongue and includes marginal portions extending laterally beyond the lateral edges of said end section, and said second guide member includes portions disposed adjacent said second portion of said guide surface for engaging only said marginal portions of said base section of said tongue.

15. The photographic apparatus of claim 12 wherein a portion of said actuating means projects outside of said housing and is manually engageable for moving said tongue into engagement with said leader and in engagement with said leader between said pressure-supply members and through said opening from said housing.

References Cited in the file of this patent

UNITED STATES PATENTS 2,554,889   Wolff _____ May 29, 1951